US006815632B2

(12) United States Patent
Dallavalle

(10) Patent No.: US 6,815,632 B2
(45) Date of Patent: Nov. 9, 2004

(54) CONTACT START PLASMA TORCH

(75) Inventor: Silvano Dallavalle, Castel S. Pietro Terme (IT)

(73) Assignee: Cebora S.p.A., Bologna (IT)

( * ) Notice: Subject to any disclaimer, the term of this patent is extended or adjusted under 35 U.S.C. 154(b) by 0 days.

(21) Appl. No.: 10/607,987

(22) Filed: Jun. 30, 2003

(65) Prior Publication Data

US 2004/0149702 A1 Aug. 5, 2004

(30) Foreign Application Priority Data

Jan. 14, 2003 (IT) .................................... BO2003A0016

(51) Int. Cl.[7] .................................................. B23K 9/00

(52) U.S. Cl. .............................. 219/121.51; 219/121.59

(58) Field of Search .............................. 219/75, 121.11, 219/121.36, 121.39, 121.45, 121.48, 121.49, 121.5, 121.51, 121.52, 121.56, 121.59

(56) References Cited

U.S. PATENT DOCUMENTS 3,242,305 A * 3/1966 Kane et al. ............ 219/121.48
4,439,662 A * 3/1984 Tateno ................... 219/121.51
5,304,770 A * 4/1994 Takabayashi ............ 219/121.5
5,393,952 A * 2/1995 Yamaguchi et al. ..... 219/121.5
5,726,415 A * 3/1998 Luo et al. .............. 219/121.48

* cited by examiner

*Primary Examiner*—Tu Hoang
(74) *Attorney, Agent, or Firm*—Squire, Sanders & Dempsey LLP

(57) ABSTRACT

A plasma torch comprises: a hollow shaft connected to a first supply pipe for a flow of a first gas and to an electrode which is hollow so that it surrounds part of the shaft and forms a first chamber for cooling the electrode and for outfeed of the first gas; a nozzle surrounding the electrode and forming a second chamber, for receiving the first gas for generating plasma, and a third chamber, for the passage of the first gas arriving from the first, cooling chamber through third pipes, to the second chamber, through second pipes which pass through the nozzle. First sealing parts are inserted between the shaft and the nozzle on both sides of the third pipes, forming a sealed zone close to the third pipes. A cylinder for driving the shaft acts upon the shaft by means of the inflow and, respectively, the outflow of a second operating fluid in a fourth chamber of the cylinder, to provide a forward starting position, in which the electrode is in contact with the nozzle, and a back operating position, in which the electrode is distanced from the nozzle, in the presence of the first gas.

25 Claims, 3 Drawing Sheets

CONTACT START PLASMA TORCH

BACKGROUND OF THE INVENTION

The present invention relates to a contact start plasma torch.

In torches of this type, normally and widely used for cutting metals, an electric arc, consisting of a voltaic arc formed between the metal object being worked on and an electrode, is used together with monoatomic or biatomic gas (for example containing argon, hydrogen, nitrogen, oxygen and others) to bring the gas to the plasma state with extremely high temperatures for melting the metal.

The structure of these torches normally comprises a torch body housing:

- a cylindrical electrode mounted centrally on the torch body and connected by a wire to the negative pole of the power supply;
- a cap or nozzle shaped anode mounted externally and surrounding the electrode, so that it covers the end of the electrode. This nozzle is electrically insulated from the electrode and can be connected, by a second wire, to the positive pole of the power supply.

The nozzle is, in turn, held in its stable operating position by another external element, called a nozzle holder, which also acts as an element connecting the various internal parts of the torch body, these parts having to be disassembled for regular substitution of parts subject to wear during use of the torch.

The nozzle holder is coated with an insulating material so that it is safe to operate and allows the gas to exit through a plurality of holes, or annular zones, distributed at its distal portion close to the nozzle-electrode assembly, to cool the operating zone.

At present, in contact start plasma torches the electrode is, in a non-operating configuration, positioned in contact with the nozzle and the electric arc is activated by moving the electrode away from the nozzle.

To move the electrode, the latter may be attached to a central shaft, housed in the torch body and mobile between the above-mentioned non-operating position in which it makes contact with the nozzle, and an operating position in which it is distanced from the nozzle, using mechanical means or the plasmagenic gas, that is to say, the gas used to generate the plasma.

Depending on the solution used for its movement, the back of this central shaft may have an architecture designed to form thrust surfaces close to the rear end, the thrust provided, for example, by the plasmagenic gas at infeed so as to allow the shaft to slide, moving the electrode away from the nozzle and so starting the plasma arc when supplied with the plasmagenic gas.

Normally, to switch off the torch, the gas supply is cut off as well as switching off the electrical power supply. A mechanical element, preferably a spring, acts on the shaft to move the electrode back towards and into contact with the nozzle.

However, this plasma torch architecture has a significant operating delay if the torch is repeatedly switched off and started, as happens during normal use.

This disadvantage is due, in particular, to the presence of gas in the pipes and the plasma chamber after switch off, gas which tends to keep the electrode away from the nozzle until completely evacuated from the internal chambers, for a finite although short time. In addition, this relative movement is not instantaneous, with inevitable wear between the parts moving relative to one another and so shortening their useful life.

The aim of the present invention is, therefore, to overcome the above-mentioned disadvantage by providing a plasma torch which has a simple, rational and safe architecture, with extremely rapid repeated start and switch off speeds and consisting of accessory elements which last extremely well over time.

SUMMARY OF THE INVENTION

This aim is achieved by a contact start plasma torch consisting of: a hollow shaft connected to a first supply pipe for a flow of a first gas and to an electrode which is hollow so that it surrounds part of the shaft and forms a first chamber for cooling the electrode and for outfeed of the first gas; a nozzle surrounding the electrode to form a second chamber for receiving the first gas for generating the plasma, and a third chamber for the passage of the first gas from the first, cooling chamber, through relative third pipes, to the second chamber through second pipes passing through the nozzle. There are also first sealing parts inserted between the shaft and the nozzle and on both sides of the third pipes, forming a sealed zone close to the third pipes; a cylinder for moving the shaft, acting on the shaft through an inflow and, respectively, an outflow of a second operating fluid in a fourth chamber of the cylinder, to provide a forward starting position, in which the electrode is in contact with the nozzle, and a back operating position, in which the electrode is distanced from the nozzle, in the presence of the first gas.

BRIEF DESCRIPTION OF THE DRAWINGS

The technical features of the present invention, in accordance with the aforesaid aims, are clearly illustrated in the claims herein, and the advantages of the invention are more clearly shown in the detailed description below, with reference to the accompanying drawings which illustrate a preferred embodiment of the invention and in which:

DESCRIPTION OF THE PREFERRED EMBODIMENTS

Figure 1:
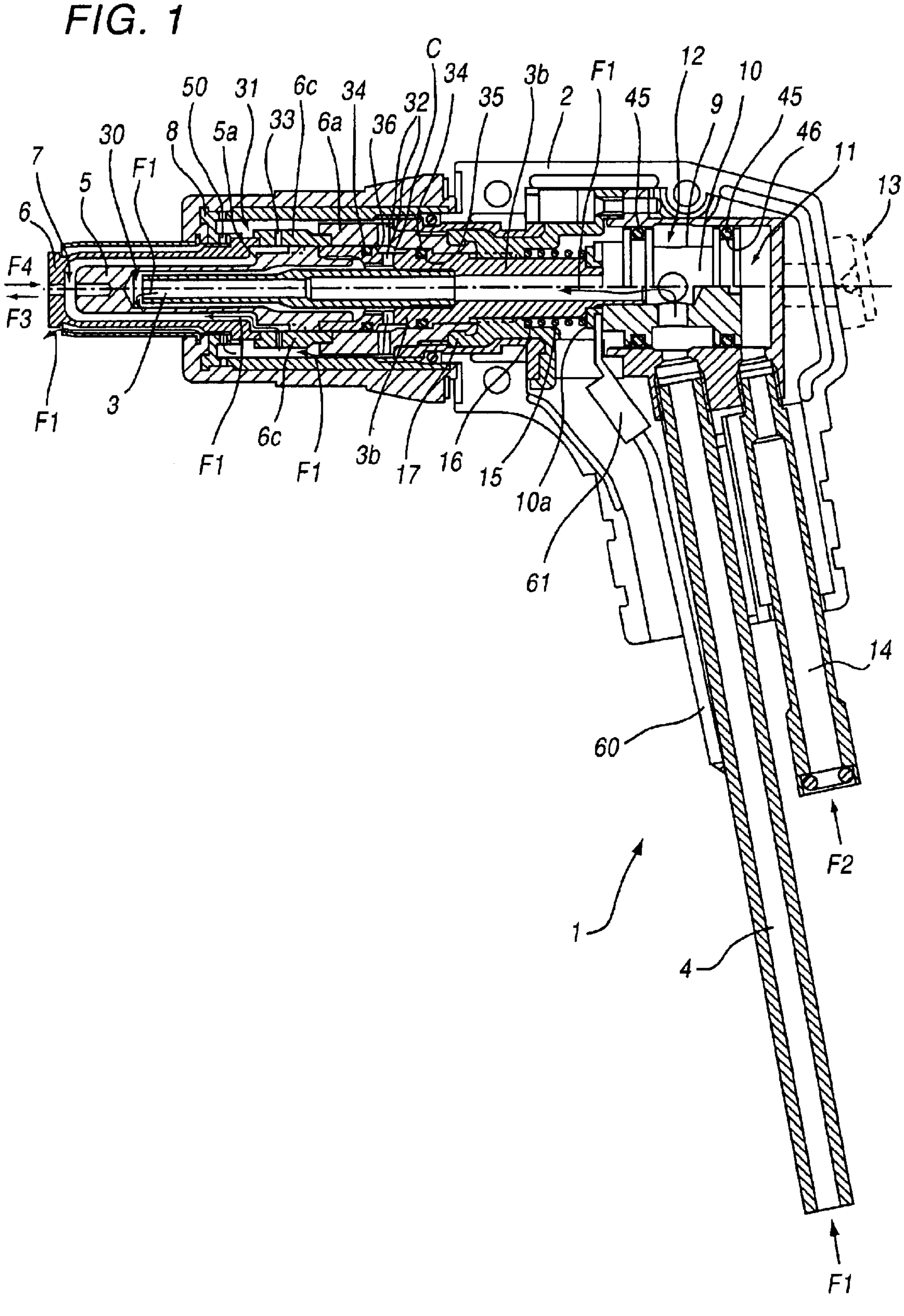
FIG. 1 is a side view with some parts in cross-section and others cut away to better illustrate some details, of a contact start plasma torch made in accordance with the present invention, in a first, back operating position.
Figure 2:
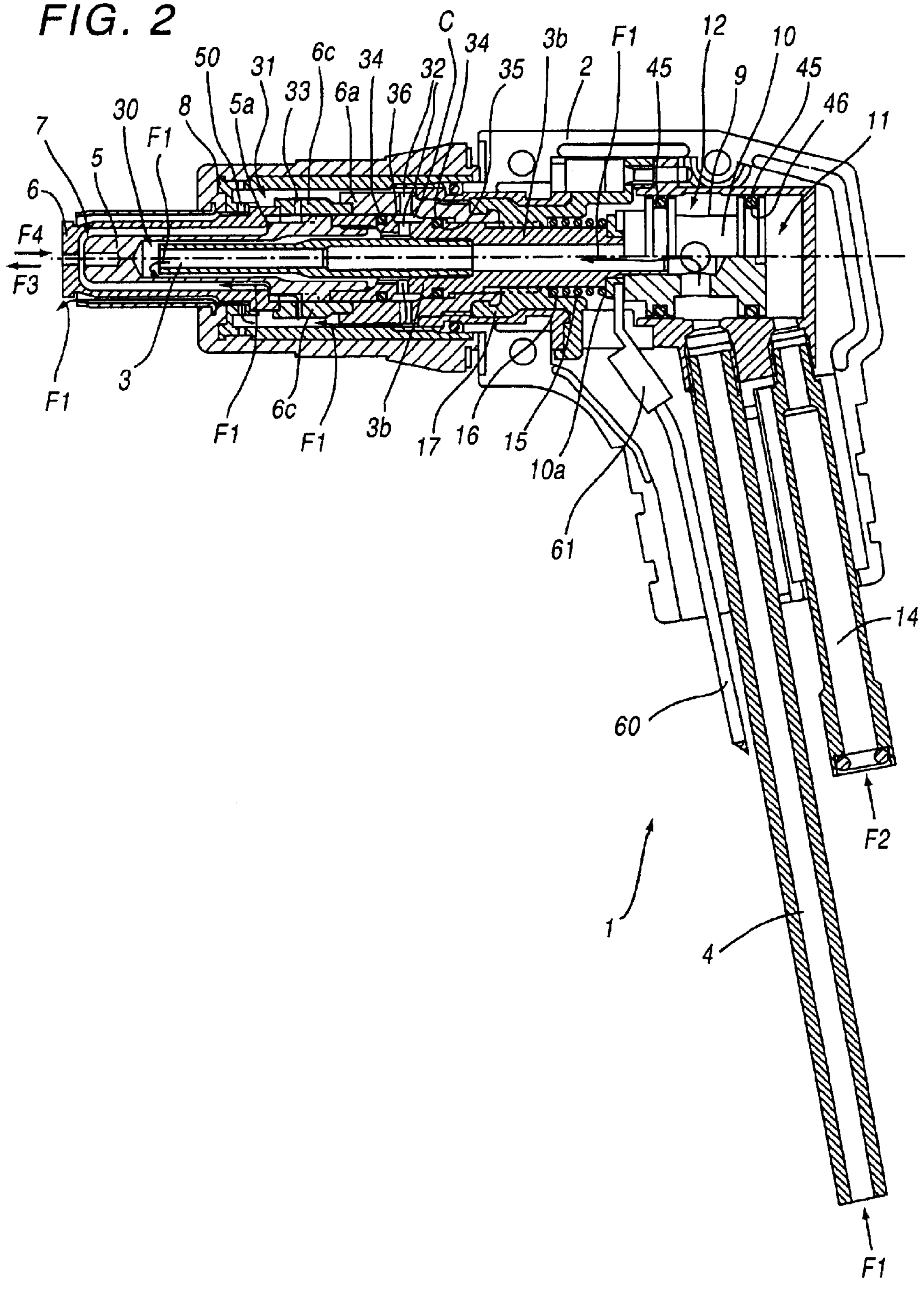
FIG. 2 is a side view with some parts in cross-section and others cut away to better illustrate some details, of the plasma torch illustrated in FIG. 1 in a second, forward starting position.

With reference to the accompanying drawings, and in particular with reference to FIGS. 1 and 2, the contact start plasma torch disclosed is normally used for cutting metals.

This torch, labeled 1 as a whole, consists of a torch body 2, extending mainly longitudinally.

Inside the torch body 2 there is a central hollow shaft 3, which can be connected to the negative pole of a current generator (not illustrated), and connected, on one side, to a first supply pipe 4 for a flow of a first gas (indicated by a set of arrows F1 and normally consisting of monoatomic or biatomic gases, for example containing argon, hydrogen, nitrogen, oxygen and others) and, on the other side to an electrode 5.

The electrode 5 is also hollow, forming a first, chamber 30 in the electrode 5 for cooling the electrode and for outfeed of the first gas F1 (as described below).

The numeral 6 denotes a nozzle which can be connected to the torch body 2 and can be electrically connected to a positive pole. The nozzle surrounds the electrode 5, forming both a second chamber 7 for receiving the first gas F1 for generating the plasma after generating the starting electric arc, and a third, intermediate chamber 31, for the passage of the first gas F1 to the second, plasma generation chamber 7.

The first gas F1 passes from the first, cooling chamber 30 to the third, intermediate chamber 31 through third pipes 32 made in the shaft 3 and in the nozzle 6, whilst the first gas passes from the third chamber 31 to the second, plasma generation chamber 7 through second pipes 33 passing through the nozzle 6.

More precisely, and completing the nozzle 6 structure, the nozzle is supported by a nozzle holder 8 forming a distal portion of the torch body 2. This nozzle 6-nozzle holder 8 structure comprises a first insulating bushing, divided into two separate parts 6*a*–6*c*, and partially surrounding a second bushing 3*b*, more internal than the first and substantially forming a portion of the hollow shaft 3.

The third pipes 32 for the passage of the first gas F1 are made in these two bushings 6*a* and 3*b*.

Fourth pipes 50 are made in the nozzle holder 8, these pipes designed to allow the first gas F1 to exit to the outside of the torch body 2 and around the nozzle 6 to cool the outside of the nozzle 6, whilst the above-mentioned second pipes 33 are made in the second part 6*c* of the nozzle 6.

Again as illustrated in FIGS. 1 and 2, first sealing parts 34 are inserted between the shaft 3 and the nozzle 6, that is to say, between the two above-mentioned bushings 6*a* and 3*b*, and on both sides of the third pipes 32, to form a sealed zone C close to the third pipes 32.

These first sealing parts 34 are necessary because the shaft 3 is moved by drive means 9 between a forward starting position, in which the electrode 5 is in contact with the nozzle 6 (see FIG. 2), and a back operating position, in which the electrode 5 is distanced from the nozzle 6, in the presence of the first gas F1 (or even irrespective of whether or not the gas is present, as described below) so that, during this distancing, the electric arc is obtained (shaft 3 movements are indicated by the arrows F3 and, respectively, F4).

Looking at the construction details, again FIGS. 1 and 2 illustrate how the first sealing parts 34 may comprise at least two O-rings housed in relative seats 35 made in the second bushing 3*b* and positioned on both sides of the third pipes 32.

Preferably, but without limiting the scope of the invention, these two O-rings may consist of floating "O-rings" housed in the seats 35.

Thanks to this seal, the third pipes 32 are made in a section of the second bushing 3*b* and the first bushing 6*a* with respective opposite annular recesses 36 forming the continuous sealed zone C for passage of the first gas F1 between the first and third chambers 30 and 31, irrespective of the position assumed by the shaft 3.

By way of example only, a floating O-ring 34 is defined as a circular seal part inserted in a relative seat 35 with seat 35 circular groove dimensions slightly larger than the internal dimension of the seal 34. When the latter is mounted, it does not press on the base of the groove forming the seat 35. In the case illustrated the seal is guaranteed on the external diameter of the fixed walls of the cylinder and on the shoulder of the groove forming the seat. This allows high speeds of movement and reduced initial detachment friction, since the seal no longer presses on the base of the seat.

The above-mentioned drive means 9 consist of a cylinder 10, connected to the shaft 3 and acting on the shaft 3 by means of an inflow and, respectively, an outflow of a second operating fluid F2, separate from the first gas F1, in a fourth chamber 11 of the cylinder 10 to provide the above-mentioned forward starting position and, respectively, back operating position.

More precisely, the cylinder 10 is connected to the rear end of the shaft 3, opposite the end with the electrode 5.

In practice, the cylinder 10 (with hollow central portion) forms the end of the shaft 3 and has a fifth chamber 12 connected to the shaft 3 for the passage of the first gas F1 in the shaft 3 and a fourth chamber 11 which receives the second operating fluid F2 which provides the shaft 3 forward and, respectively, back positions.

As illustrated in FIGS. 1 and 2, the fifth and fourth chambers 12 and 11 are directly connected to a relative first 4 and second 14 supply channel respectively for the first gas F1 and the second operating fluid F2.

The second channel 14 may be fitted with rapid discharge valve means 44 for the second operating fluid F2, to allow faster passage from the shaft 3 forward position to the back position.

Alternatively, as illustrated in FIG. 1, the fourth chamber 11 may be directly fitted with alternative rapid discharge valve means 13 (for example, a single-acting valve illustrated with a dashed line) for the second operating fluid F2, allowing rapid passage from the shaft 3 forward position to the back position.

This solution may be preferable, for example, when the torch 1 has very long cables, a structure used in automatic systems, to optimize high speed discharging of the second operating fluid F2.

Figure 3:
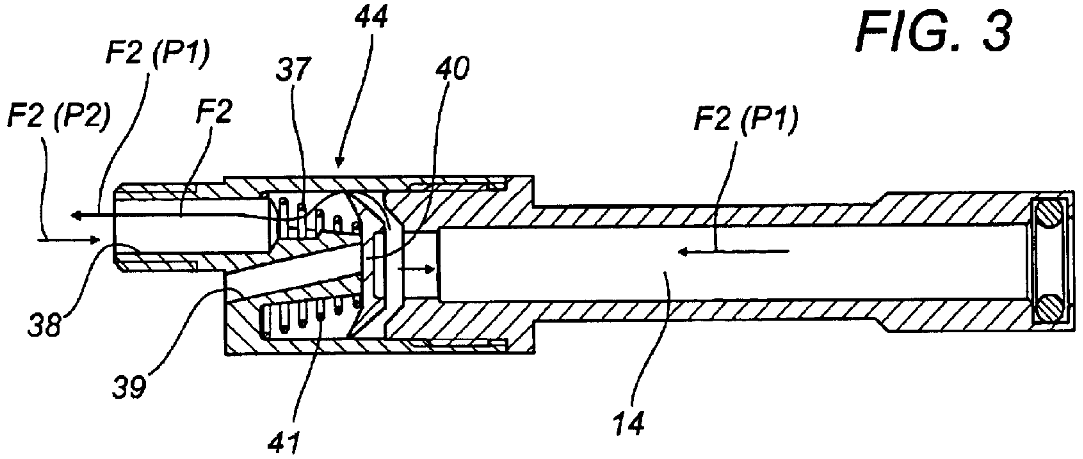
FIGS. 3, 4 and 5 are longitudinal sections illustrating respective embodiments of a construction detail of the torch illustrated in the previous figures.
Figure 4:
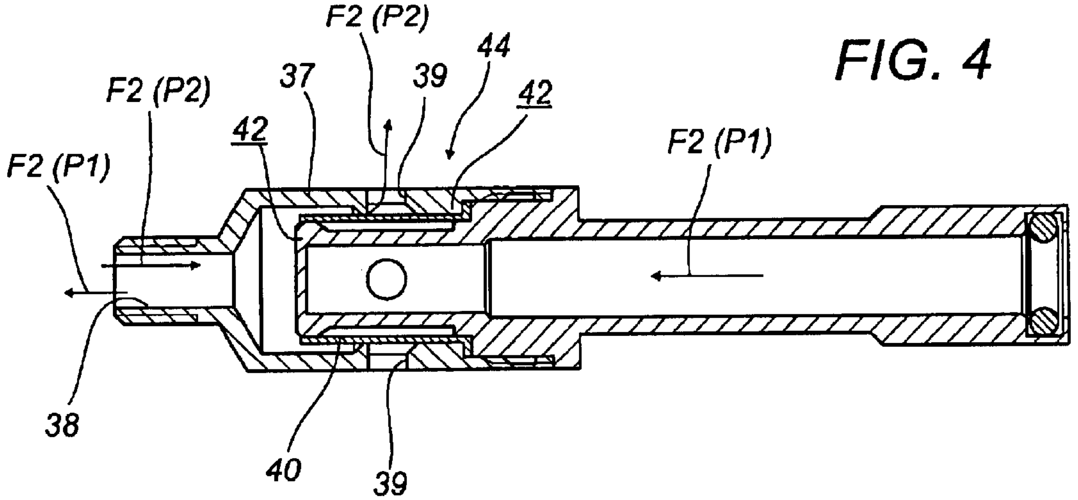
Figure 5:
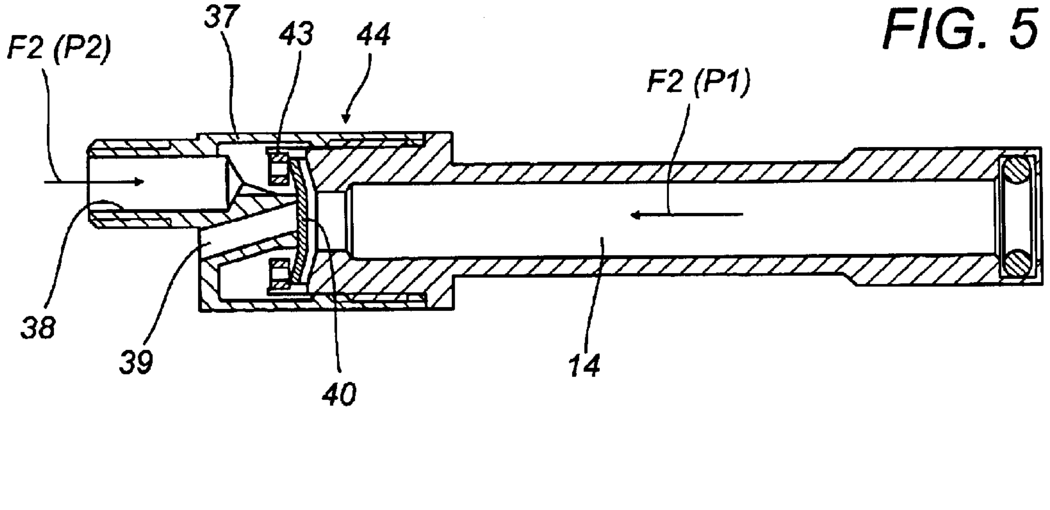

As illustrated in FIGS. 3 to 5, the rapid discharge valve means 44 may comprise a unit 37 for connection and selection of the second fluid F2 inflow, inserted between the second supply channel 14 and the fourth chamber 11.

In all of the solutions illustrated, the connecting unit 37 comprises a fork consisting of at least a first hole 38 and a second hole 39 respectively giving onto the fourth chamber 11, and the outside of the torch 1 and separated from the second channel 14 by a sealing part 40 designed to form the connections between the second channel 14 and the first hole 38, or both the first 38 and second 39 holes, depending on the position which can be assumed by the shaft 3.

In a first embodiment, illustrated in FIG. 3, the sealing part 40 may be ring-shaped, forming a valve which is mobile in the unit 37 between:

- a first position allowing passage of the second fluid F2 towards the first hole 38, in which the seal 40 is distanced from the second channel 14 (by the pressure P1 of the second fluid F2), blocking the second hole 39, and allowing the second fluid F2 to flow along its external circumference, towards the first hole 38, and
- a second position for discharging the second fluid F2, in which the seal 40 blocks the second channel 14, allowing direct communication between the first and second holes 38 and 39 by means of the action of the pressure P2 (greater than the pressure P1) of the second fluid F2 arriving from the fourth chamber 11, when a valve (not illustrated) for cutting off the fluid supply to the fourth chamber 11 is activated.

The ring-shaped sealing part 40 can preferably, but without limiting the scope of the invention, be acted upon by spring means 41 inserted between the sealing part 40 and an internal surface of the unit 37, allowing the seal 40 to rapidly pass from the first position to the second, discharging position.

Taking advantage of this idea of sealing part 40 activation, in a second embodiment illustrated in FIG. 4, the sealing part 40 has a cylindrical shape, surrounding an internal end portion of the second channel 14 and held at its ends on both sides by annular projections 42 of the end portion and, respectively, of the unit 37 so as to allow a deformation of the section of a part of the seal 40 according to the position which can be assumed by the shaft 3 and, therefore, the pressures P1 and P2 from the second channel 14 or from the first hole 38.

In practice, the sealing part 40 is partially distanced from the end portion when the second fluid F2 is supplied P1 from the second channel 14, blocking the second holes 39, but allowing the second fluid F2 to flow towards the first hole 38, whilst the increase in pressure P2 when the above-mentioned valve is closed crushes the section of the sealing part 40, closing the second channel 14 and allowing passage of the second fluid F2 from the fourth chamber 11 towards the second holes 39 and, therefore, to the outside of the torch 1.

In a third embodiment illustrated in FIG. 5 the sealing part 40 is again ring-shaped, forming a valve which moves by means of a guide 43 consisting of a contact ring with holes drilled in it, attached to the connecting unit 37.

As in the case illustrated in FIG. 3, the sealing part 40 can move, inside the unit 37, between a first position, allowing passage of the second fluid F2 towards the first hole 38 (also through the ring with holes drilled in it 43), and a second position in which the second fluid F2 is discharged to the outside, again through the action of the two pressures P1 and P2, in which the seal 40 blocks the second channel 14, allowing communication between the first and second holes 38 and 39.

Returning to the cylinder 10 which drives the shaft 3, the cylinder may be fitted with second sealing means 45 designed to separate the fourth and fifth chambers 11 and 12 from one another and, respectively, the fifth chamber 12 from the rest of the torch body 2.

These second sealing means 45 may comprise two O-rings housed in relative seats 46 in the cylinder 10 and positioned on both sides of the fifth chamber 12.

Similarly to the first sealing parts, the second sealing parts 45 comprise two O-rings which are floating "O-rings" housed in the seats 46 in the cylinder 10. Another detail in the torch 1 is spring means 15 inserted between the torch body 2 and the shaft 3, allowing rapid shaft 3 sliding from the forward position to the back position when the second operating fluid F2 flows out of the cylinder 10.

In more detail, the spring means 15 are inserted between a wall 16 formed by a fixed internal support 17 of the torch body 2 slidably housing the shaft 3, and a cylinder 10 supporting wall 10*a*.

As regards the second operating fluid, this may consist of inert gases or, preferably, air generated and controlled by a suitable compressor (not illustrated).

Another distinctive element of the torch 1 disclosed is the presence on the nozzle 6 and on the electrode 5 of respective annular contact surfaces 6*b*, 5*a* for torch starting, in a position which forms an intermediate zone between the distal end and the proximal end of the electrode 5. In particular, these annular surfaces 6*b*, 5*a* have contact faces that are flat, but such that they allow the passage of the first fluid F1 into the second, plasma generation chamber 7.

Another element present in the torch 1 disclosed is a flexible cable 60 (see FIGS. 1 and 2) connected, on one side, to the first supply pipe 4 for the first gas F1 (that is to say, to the torch 1 negative pole), whilst the other side of the cable 60 is connected, by its terminal 61, to the hollow shaft 3, providing an extremely safe connection to the negative pole, that is to say, so that the current flows through stable points which are free of overheating defects over time (which creates oxidation on contact surfaces) which would result in precarious contacts and torch operating faults.

Therefore, the torch structured in this way achieves the preset aims thanks to a simple structure which is more compact and allows an extremely rapid starting speed.

The presence of the cylinder and the second operating fluid allows, in the presence of the first gas, rapid torch starting by means of rapid backward movement of the shaft thanks to emptying of the second chamber housing the second operating fluid and thanks to the normal thrust of the first gas fed into the relative chamber. This is made more rapid and safe by the presence of the spring which, once the second cylinder chamber is emptied, also pushes the shaft into the back position.

Moreover, the spring guarantees a constant high level of safety in avoiding contact between the electrode and the nozzle during the operating step and in cases in which the pressures of the fluids fall with potential danger for the operator.

Repeated starts and switch offs are managed in a rapid, optimum way, because of the presence of the second operating fluid which, equally rapidly, is allowed to flow into or discharged from the second chamber with simple compact controls, that is to say, with rapid discharge means which, from a construction viewpoint, are compact and so can be mounted on the torch body.

In addition to this, the possibility of cooling the inside of the electrode reduces the O-ring operating temperature. Wear on the seals in this architecture is practically negligible, since the seals are of the floating type, as on the driving cylinder and allow a significant reduction in the initial detachment friction, therefore, extending the operating life of the seals. This solution also has a positive effect on the construction of the parts which contain the seals, which require less precision and so are more economical.

Moreover, it should be said that the first fluid is introduced substantially at the center of the two pairs of seals (shaft and cylinder), allowing a neutral effect as regards the forces exerted by the pressure of the first fluid.

As already indicated, torch starting occurs laterally on two flat faces and in an electrode intermediate position with advantages in terms of construction and wear, at the same time retaining the possibility of the first fluid passing towards the second, plasma generation chamber.

The structure of the torch as described and use of the second fluid means that the electrode can normally be kept in a position in which it is distanced from the nozzle and this allows:

- use of the torch with starting systems with and without high frequency (HF), without substituting or adding or modifying any construction details;
- improved torch safety, since, if the positive pole is, for any reason, interrupted and the torch activation button is pressed, even if the operator were to make contact with the electrode (that is to say, the negative pole) and the earth wire (connected to the workpiece to be cut and to the positive pole), there would not be any harmful effects on the operator, thanks to the fact that the electrode is in a position distanced from the nozzle.

The invention described can be subject to numerous modifications and variations without thereby departing from the scope of the inventive concept. Moreover, all the details of the invention may be substituted by technically equivalent elements.

What is claimed is:

1. A contact start plasma torch, wherein it comprises, inside a torch body extending mainly longitudinally:

a hollow shaft, connected on one side to a first supply pipe for a flow of a first gas and, on the other side, to an electrode which is hollow so that it surrounds part of the shaft and forms, close to the internal end of the electrode, a first, internal chamber for cooling the inside of the electrode and for outfeed of the first gas;

a nozzle body, which is electrically connected to a positive pole, surrounding the electrode and forming:

a second chamber, for receiving the first gas for generating plasma;

a third, intermediate chamber, for the passage of the first gas, said first gas arriving from the first, cooling chamber through third pipes made in the shaft and the nozzle body, to at least the second, plasma generation chamber through second pipes passing through the nozzle body;

first sealing parts, being inserted between the shaft and the nozzle body and on both sides of the third pipes, forming a sealed zone close to the third pipes;

shaft drive means, consisting of a cylinder, connected to the shaft and acting on the shaft by means of an inflow and, respectively, an outflow of a second operating fluid in a fourth chamber of the cylinder, said second operating fluid being separate from the first gas, in a fourth chamber of the cylinder, to provide a forward starting position, in which the electrode is in contact with the nozzle body, and a back torch operating position, in which the electrode is distanced from the nozzle body, in the presence of the first gas.

2. The torch according to claim 1, wherein the first sealing parts comprise at least two O-rings housed in relative seats made in the shaft and positioned on both sides of the third pipes.

3. The torch according to claim 1, wherein the first sealing parts comprise two O-rings which are floating O-rings housed in relative seats in the shaft and positioned on both sides of the third pipes.

4. The torch according to claim 1, wherein the nozzle body comprises a first insulating bushing, partially surrounding a second bushing, more internal than the first insulating bushing, and forming a portion of the hollow shaft; the third pipes being made in the first and second bushings, having opposite annular recesses forming a sealed zone for the continuous passage of the first gas between the first and third chambers, irrespective of the position assumed by the shaft, said zone being delimited by the first sealing parts on both sides.

5. The torch according to claim 1, wherein the cylinder is connected to the rear end of the shaft, opposite the end of the shaft with the electrode.

6. The torch according to claim 1, wherein the cylinder is connected to the rear end of the shaft, opposite the end of the shaft with the electrode; the cylinder forming a fifth chamber connected to the shaft and allowing the passage of the first gas in the shaft and a fourth chamber for receiving the second operating fluid so as to provide the shaft forward and, respectively, back positions.

7. The torch according to claim 6, wherein the fourth chamber is fitted with valve means for rapidly discharging the second operating fluid when passing from the shaft forward position to the back position.

8. The torch according to claim 6, wherein the fifth and fourth chambers are directly connected to a relative first and second supply channel, respectively for the first gas and the second operating fluid.

9. The torch according to claim 8, wherein the second channel is fitted with valve means for rapidly discharging the second operating fluid when passing from the shaft forward position to the back position.

10. The torch according to claim 9, wherein the rapid discharge valve means comprise a unit for connection and selection of the second fluid inflow, being inserted between the second supply channel and the fourth chamber; the unit having a fork consisting of a first and a second hole respectively giving onto the fourth chamber and the outside of the torch and separated from the second channel by a sealing part designed to form the connections between the second channel and the first hole or both the first and second holes, depending on the position which is assumed by the shaft.

11. The torch according to claim 10, wherein the sealing part is ring-shaped, forming a valve which is mobile, inside the unit, between a first position allowing the passage of the second fluid towards the first hole, in which the seal is distanced from the second channel and blocks the second hole, and a second position for discharging the second fluid, in which the seal blocks the second channel, allowing communication between the first and second holes.

12. The torch according to claim 11, wherein spring means act upon the sealing part, said spring means being inserted between the sealing part and an internal surface of the unit so as to allow the seal to pass rapidly from the first position to the second, discharging position.

13. The torch according to claim 10, wherein the sealing part has a cylindrical shape, surrounding an internal end portion of the second channel and held at its ends on both sides by annular projections of the end portion and, respectively, of the unit, allowing a deformation of the section of the seal according to the position which is assumed by the shaft and, therefore, the pressures from the second channel or from the first hole.

14. The torch according to claim 10, wherein the sealing part is ring-shaped, forming a valve which moves by means of a circular contact guide attached to the connecting unit; the sealing part moving, inside the unit, between a first position allowing the passage of the second fluid towards the first hole, in which the seal is distanced from the second channel and blocks the second hole, and a second position for discharging the second fluid, in which the seal blocks the second channel, allowing communication between the first and second holes.

15. The torch according to claim 6, wherein the cylinder has second sealing parts designed to separate the fourth and fifth chambers from one another and, respectively, the fifth chamber from the rest of the torch body.

16. The torch according to claim 15, wherein the second sealing parts comprise at least two O-rings housed in relative seats in the cylinder and positioned on both sides of the fifth chamber.

17. The torch according to claim 15 wherein the second sealing parts comprise at least two O-rings which are floating O-rings housed in relative seats in the cylinder and positioned on both sides of the fifth chamber.

18. The torch according to claim 1, wherein spring means are inserted between the torch body and the shaft, the spring means being designed to allow the shaft to slide rapidly from the forward position to the back position when the second operating fluid flows out of the cylinder.

19. The torch according to claim 18, wherein the spring means are inserted between a wall formed by a fixed internal support of the torch body, slidably housing the shaft, and a cylinder front supporting wall.

20. The torch according to claim 1, wherein the second operating fluid is a gas.

21. The torch according to claim 1, wherein the second operating fluid is air.

22. The torch according to claim 1, wherein the nozzle body and the electrode have a respective annular contact surface for torch starting in a position forming an intermediate zone between the distal end and the proximal end of the electrode.

23. The torch according to claim 22, wherein the annular surfaces of the nozzle body and the electrode have flat contact faces.

24. The torch according to claim 1, wherein the nozzle body is supported by a nozzle holder, forming a distal portion of the torch body, and having fourth pipes allowing the first gas to exit the third, intermediate chamber to the outside of the torch body and around the nozzle body, so as to cool the outside of the nozzle body the nozzle body comprising a first insulating bushing divided into two separate portions, through one of which the second pipes pass.

25. The torch according to claim 1, wherein it comprises a flexible connected, on one side, to the first supply pipe for the first gas and to a torch negative pole, the other side of the cable being connected, by its terminal, to the hollow shaft, to provide a stable connection and current flow.

* * * * *